(12) United States Patent
Pyrcz et al.

(10) Patent No.: US 8,954,303 B2
(45) Date of Patent: Feb. 10, 2015

(54) SYSTEM AND METHOD FOR GENERATING A GEOSTATISTICAL MODEL OF A GEOLOGICAL VOLUME OF INTEREST THAT IS CONSTRAINED BY A PROCESS-BASED MODEL OF THE GEOLOGICAL VOLUME OF INTEREST

(75) Inventors: Michael James Pyrcz, Humble, TX (US); Miriam S. Andres, Oakland, CA (US); Frank William Harris, III, Danville, CA (US); Marjorie Levy, Danville, CA (US); Paul Mitchell Harris, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 82 days.

(21) Appl. No.: 13/170,462

(22) Filed: Jun. 28, 2011

(65) Prior Publication Data
US 2013/0006591 A1    Jan. 3, 2013

(51) Int. Cl.
*G06G 7/48* (2006.01)
*G01V 99/00* (2009.01)

(52) U.S. Cl.
CPC .................................. *G01V 99/005* (2013.01)
USPC .......................................................... 703/10

(58) Field of Classification Search
USPC .......................................................... 703/10
See application file for complete search history.

(56) References Cited

U.S. PATENT DOCUMENTS

2007/0219724 A1   9/2007   Li et al.
2011/0098930 A1   4/2011   Pyrcz et al.
2011/0098997 A1   4/2011   Pyrcz et al.

OTHER PUBLICATIONS

Interview exhibit 1; one page, exhibit for interview of Apr. 30, 2014.*
Interview exhibit 2; one page, exhibit for interview of Apr. 30, 2014.*
International Search Report and Written Opinion for PCT/US2012/037779 mailed Oct. 29, 2012.
Cross, T.A., and Harbaugh, J.W., 1990, Quantitative Dynamic Stratigraphy: A Workshop, A Philosophy, A Methodology, In: Quantitative Dynamic Stratigraphy (Ed. By T.A. Cross), pp. 3-20. Prentice Hall, Eaglewood Cliffs, New Jersey.
Leuangthong, O., McLennan, J.A., and Deutsch, C.V., Minimum Acceptance Criteria for Geostatistical Realizations, Natural Resources Research, 13 (3), Sep. 2004, pp. 131-141.
Pyrcz, M.J., Catuneanu, O. and Deutsch, C.V., 2005, Stochastic Surface-based Modeling of Turbidite Lobes, American Association of Petroleum Geologists Bulletin, vol. 89., No. 2, pp. 177-191.
Strebelle, S., Conditional Simulation of Complex Geological Structures Using MultiplePoint Statistics, Mathematical Geology, vol. 32, No. 9, 2002, p. 29372954.
U.S. Appl. No. 12/604,932.

(Continued)

*Primary Examiner* — Hugh Jones
(74) *Attorney, Agent, or Firm* — Albert K. Shung

(57) ABSTRACT

A process-based model of a geological volume of interest is generated. The process-based model is conditioned with conditioning information associated with the geological volume of interest. Statistics are generated from the process-based model that represent parameters of the geological volume of interest locally. These statistics are used to constrain one or more geostatistical models of the geological volume of interest.

15 Claims, 2 Drawing Sheets

(56) References Cited

OTHER PUBLICATIONS

Bassant, Phil, Harris, Paul; Analyzing Sequence Architecture and Reservoir Quality of Isolated Carbonate Platforms with Forward Stratigraphic Modeling; Chevron Energy Technology Company, Controls on Carbonate Platform and Reef Development (2008) p. 343-359.

Boisvert, J., Pyrcz, M.J. and Deutsch, C.V., 2009, Multiple Point Statistics for Training Image Selection, Natural Resources Research, Dec. 2007, p. 313-321.

Caers, J., Feb. 2007, Comparing of the Gradual Deformation with the Probability Perturbation Method for Solving Inverse Problems, Mathematical Geology, v. 39, No. 1, p. 27-52.

Khan, D., Strebelle, S., Hanggoro, D., Willis, B., and Pyrcz, M.J., 2008, Non-Stationary Multiple Point Simulation of Complex Deltaic Deposits for Reservoir Models, in Ortiz, J. and Emery, X. (eds.), Geostatistics Santiago 2008, Springer, Netherlands, p. 217-226.

Boisvert, J., Pyrcz, M.J. and Deutsch, C.V., 2010, Multiple Point Metrics to Assess Categorical Variable Models, Natural Resources Research, Sep. 2010, p. 165-175.

Miller, J., Sun, T., Hongmei, L., Stewart, J., Genty, C., Li, D., and Lyttle, C., Dec. 2008, Direct modeling of Reservoirs through forward process-based models: Can we get there?, International Petroleum Technology Conference, IPTC 12729, p. 3-6.

Pyrcz, M.J., Sullivan, M.D., McHargue, T.R., Fildani, A., Drinkwater, N.J., Clark, J., and Posamentier, H.W., 2010, Numerical Modeling of Deepwater Channel Stacking Pattern from Outcrop and the Quantification of Reservoir Significance, SEPM special publication—Outcrops Revitalized, SEPM Concepts in Sedimentology and Paleontology, p. 149-159.

Strebelle, S., Conditional Simulation of Complex Geological Structures Using MultiplePoint Statistics, Mathematical Geology, vol. 34, No. 1, 2002, p. 1-21.

Pyrcz, Michael James; "Integration of Geologic Information into Geostatistical Models"; Thesis, University of Alberta, 2004, pp. 1-296.

Miller, James, et al.; "Direct Modeling of Reservoirs Through Forward Process-Based Models: Can We Get There?"; International Petroleum Technology Conference (IPTC 12729), 2008, pp. 1-12.

Michael, H.A., et al.; "A Combined Process-Based and Geostatistical Methodology for Simulation of Realistic Heterogeneity with Data Conditioning"; Abstract, pp. 1-35.

* cited by examiner

SYSTEM AND METHOD FOR GENERATING A GEOSTATISTICAL MODEL OF A GEOLOGICAL VOLUME OF INTEREST THAT IS CONSTRAINED BY A PROCESS-BASED MODEL OF THE GEOLOGICAL VOLUME OF INTEREST

FIELD

The disclosure relates generally to the generation of a geostatistical model that is constrained by a process-based model of the geological volume of interest.

BACKGROUND

Systems and methods for generating process-based models of a geological volume of interest are known. Process-based models are generated to gain an understanding of the processes that were formed to create the geological volume of interest. Process-based models can be conditioned to conditioning information such as, for example, seismic, well data, analogs, core data, and/or other information, but conditioning is typically approximate and/or impractical.

Systems and methods for generating geostatistical reservoir models of a geological volume of interest are known. Geostatistical models may be conditioned to conditioning information, but typically lack any process information.

SUMMARY

One aspect of the disclosure relates to a system configured to generate a geostatistical model of a geological volume of interest. In some embodiments, the system includes one or more processors configured to execute a conditioning information module, a process model module, a statistics module, and a statistical model module. The conditioning information module is configured to obtain conditioning information associated with the geological volume of interest, wherein the conditioning information includes information derived from measurements made at or near the geological volume of interest. The process model module is configured to generate a process-based model of the geological volume of interest, wherein the process-based model is conformed to the conditioning information associated with geological volume of interest. The statistics module is configured to generate statistics from the process-based model that are faithful to the process information in the process-based model, wherein individual ones of the statistics are determined locally within the process-based model such that the value of a given statistic varies as a function of location within the process-based model. The statistical model module is configured to generate a geostatistical model of the geological volume of interest that is constrained by the statistics generated by the statistics module.

Another aspect of the disclosure relates to a method of generating a geostatistical model of a geological volume of interest. In some embodiments, the method includes obtaining conditioning information associated with the geological volume of interest, wherein the conditioning information includes information derived from measurements made at or near the geological volume of interest; generating a process-based model of the geological volume of interest, wherein the process-based model is conformed to the conditioning information associated with geological volume of interest; generating statistics from the process-based model that are faithful to the process information in the process-based model, wherein individual ones of the statistics are determined locally within the process-based model such that the value of a given statistic varies as a function of location within the process-based model; and generating a geostatistical model of the geological volume of interest that is constrained by the statistics generated by the statistics module.

Yet another aspect of the disclosure relates to non-transitory electronic storage media storing machine-readable instructions that cause one or more processors to perform operations that result in generation of a geostatistical model of a geological volume of interest. In some embodiments, the operations comprise obtaining conditioning information associated with the geological volume of interest, wherein the conditioning information includes information derived from measurements made at or near the geological volume of interest; generating a process-based model of the geological volume of interest, wherein the process-based model is conformed to the conditioning information associated with geological volume of interest; generating statistics from the process-based model that are faithful to the process information in the process-based model, wherein individual ones of the statistics are determined locally within the process-based model such that the value of a given statistic varies as a function of location within the process-based model; and generating a geostatistical model of the geological volume of interest that is constrained by the statistics generated from the process-based model.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
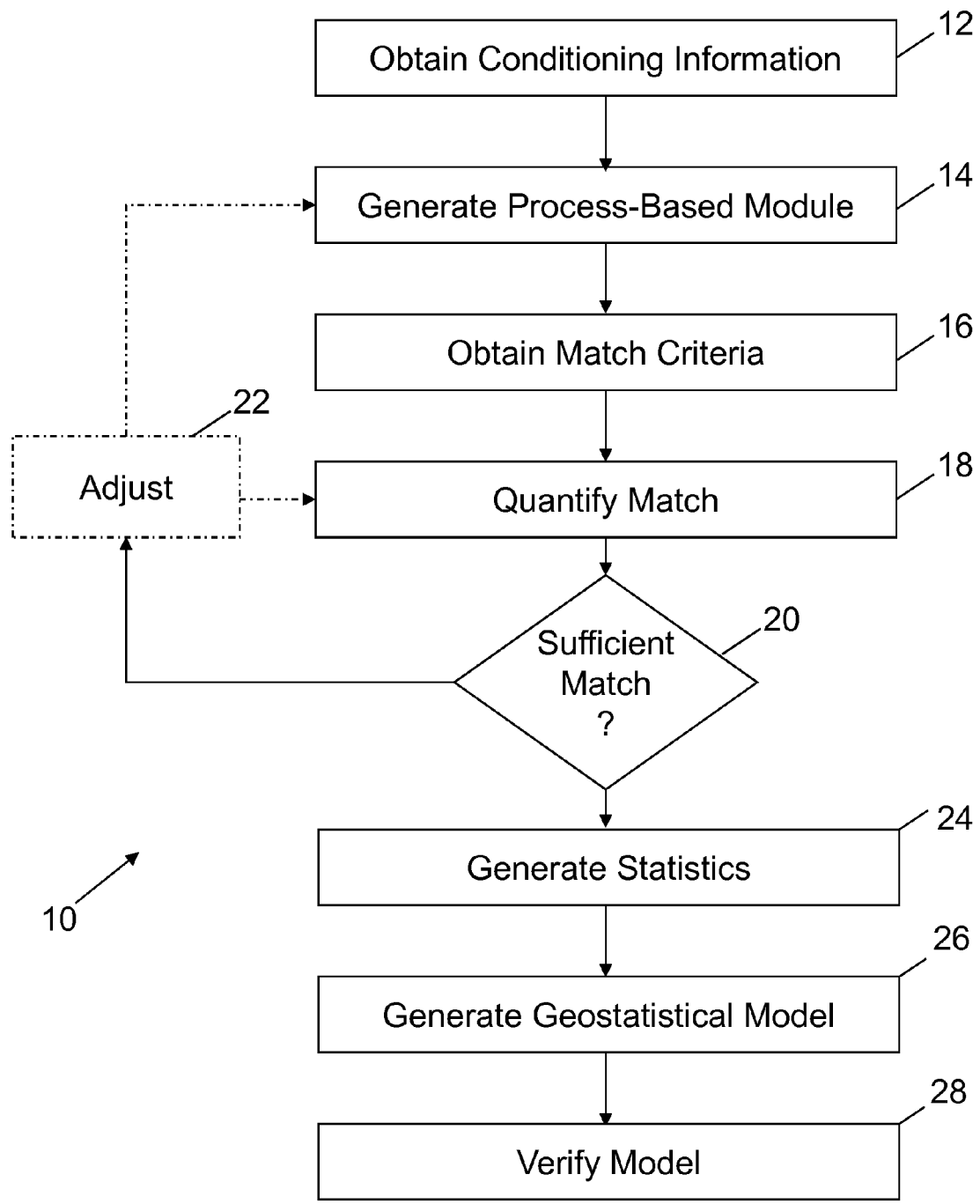
FIG. 1 illustrates a method of generating a geostatistical reservoir model of a geological volume of interest.

The present technology may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present technology may be coded in different languages for application in a variety of computing platforms and environments. It will be appreciated that the scope and underlying principles of the present technology are not limited to any particular computer software technology.

Moreover, those skilled in the art will appreciate that the present technology may be practiced using any one or combination of hardware and software configurations, including but not limited to a system having single and/or multi-processor computer processors system, hand-held devices, programmable consumer electronics, mini-computers, mainframe computers, and the like. The technology may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present technology. Such devices and articles of manufacture also fall within the spirit and scope of the present technology.

Referring now to the drawings, embodiments of the present technology will be described. The technology can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present technology are discussed below. The appended drawings illustrate only typical embodiments of the present technology and therefore are not to be considered limiting of its scope and breadth.

FIG. 1 illustrates a method 10 of generating a geostatistical model of a geological volume of interest (e.g., including a subsurface volume). The operations of method 10 presented below are intended to be illustrative. In some embodiments, method 10 may be accomplished with one or more additional operations not described, and/or without one or more of the operations discussed. Additionally, the order in which the operations of method 10 are illustrated in FIG. 1 and described below is not intended to be limiting.

In some embodiments, method 10 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 10 in response to instructions stored electronically on an electronic storage medium. The one or more processing devices may include one or more devices configured through hardware, firmware, and/or software to be specifically designed for execution of one or more of the operations of method 10.

At an operation 12, conditioning information associated with the geological volume of interest is obtained. The conditioning information includes information derived from measurements made at or near the geological volume of interest. The conditioning information may specify properties and/or parameters of the geological volume of interest for specific locations within the geological volume of interest. Such information may include, for example, well data, core data, seismic data, analog information, expert information, and/or other information. The properties and/or parameters may include one or more of measured values, summary statistics (including averages, proportions, variances, correlations etc.), univariate, multivariate and/or spatial distributions (texture, covariance, distribution of runs etc.), geometry (thickness, slope, undulation etc.) and any trend, combination and/or derivative, and/or other properties or parameters. The conditioning information may be obtained, for example from electronic storage configured to non-transiently store previously acquired conditioning information, from user input, over a network, and/or from other sources.

At an operation 14, a process-based model of the geological volume of interest is generated. As used herein a process-based model may refer to a model of the geological volume of interest that is generated by beginning with an initial reservoir (or other geological structure), and then modeling individual processes (e.g., flows, slope failures, local erosion and deposition, denudation and aggradation, dissolution and precipitation, cementation, growth, compaction and tectonic modification, and/or other process types) on top of the initial reservoir and/or previously modeled processes. The modeled processes are generated and applied to the process-based model during formation in an attempt to represent and/or reconstruct the original processes that occurred over time to create the geological volume of interest. The process-based model generated at operation 14 represents rock types (including grain size, trends, types, etc.) and reservoir properties (including porosity, permeability) and their associated distributions, trends and geometries for locations throughout the geological volume of interest.

One or more parameters of an individual process may be determined stochastically and/or deterministically. For example, initial basin shape, origin, path, sediment discharge, types and locations (and associated timing), compaction and tectonic history, changes in local base level, and/or other parameters of an individual process may be determined stochastically and/or deterministically. By way of non-limiting example, U.S. patent application Ser. No. 12/604,932, entitled "System And Method For Modeling A Geologic Volume of Interest," and filed Dec. 23, 2009, which is hereby incorporated by reference into the present application in its entirety, provides a description of process-based modeling.

The processes in the process-based model are generated as outputs to an algorithm. The algorithm includes inputs such as, for example, one or more of initial topography (including shape and gradients) and associated initial basin rock properties (grain size, cohesion, erodability, rock type etc.). Also inputs for associated processes such as flows (e.g. discharge, grain size and rock type etc.), rock generation (e.g. carbonate growth, dissolution and precipitation etc.), tectonic change (e.g. faulting, rates, change in rates), eustatic cycles (e.g. amplitude and frequency and change in rates), compaction (e.g. rates based on rock type and other information), diagenetic alteration (e.g. changes in rock properties after deposition as a function of rock type and local state etc.), and parameterization of other transportation mechanisms (e.g. currents, wind, slope failure etc.). These may be based on physical laws, empirical rules or imposed directly on the model by expert knowledge (e.g. instead of using a compaction law, one can map compaction over a time step and impose) and may be all considered static or variable with respect to time and locality. Other inputs are contemplated.

Generation of the process-based model may include generating and applying one process at a time to the model, and/or generating and applying a series of processes corresponding to some increment of time during formation of the actual geological volume of interest. The inputs used to generate the individual processes and/or series of processes may include one or more inputs that are the same across the processes/series of the model, and/or one or more inputs that are adjusted between processes/series of the model (e.g., to account for changes in conditions during the formation of the actual geological volume of interest over time).

In some embodiments, the technique used to generate the process-based model at operation 14 is configured to condition the model to the conditioning information obtained at operation 12. Such conditioning may include constraining stochastic determination of one or more parameters of a process in accordance with conditioning information, adjusting one or more inputs to the algorithm used to generate the model based on conditioning information, and/or other mechanisms for conditioning the processes. The conditioning may be approximate, and/or accurate. Accurate is a model state in that the conditioning is honored exactly at the data locations and is not generally possible or practical with process-based models. This means that at a specific location for which a measured parameter is included in the conditioning data, the value of the same parameter at the specific location in the process-based model is constrained to the measured value in the conditioning data. Approximate is a state in that the same general features observed in the conditioning are reproduced in the process-based model in the same location as determined by any local statistics (including those listed in section 19 or any others).

At an operation 16, match criteria is obtained. The match criteria establish the necessary correspondence between the process-based model generated at operation 14 and the conditioning information obtained at operation 12. The process-based model and the conditioning information are said to "match" if a real geological volume having the structure of the process-based model would be expected to produce conditioning information that is the same as the conditioning information obtained at operation 12. By way of non-limiting example, the match criteria may establish a level of match required, a parameter that must be matched, thresholds that should be exceeded or not, state that should exist, and/or other criteria. The parameter that must be matched may include one or more of local stratal correlation styles, compartments and boundaries to constrain the reservoir grid and volume, local regions or populations with unique statistics and statistics that characterize the transitions between such regions, locally variable spatial continuity models including geometries, semivariogram parameters and directions of continuity, locally variable correlation coefficients for stochastic cosimulation, locally variable transition probabilities, bivariate and multivariate distributions, multiple point statistics, and/or other parameters.

Various criteria may be established on a per process (or other localized area) basis, a per conditioning information source basis, and/or on other segmented basis. In some embodiments, a level of match is set through a threshold level of a match metric that quantifies match between the process-based model and the conditioning information. The match criteria may be obtained through an automated determination and/or based on user input. Match criteria may be determined and/or adjusted based on, for example, current and/or future applications of the geostatistical model being produced by method 10. For example, for the purpose of volumetrics simple geometric match criteria may be applied without consideration of heteroscedasticity. In another example, for detailed well placement, match criteria may consider high resolution heterogeneity available in the conditioning data.

At an operation 18, match between the process-based model and the conditioning information is quantified. This quantification may include generating one or more match metrics that indicate a closeness in match between the process-based model and the conditioning information. The match metric(s) may be determined on a per conditioning information source basis, a per conditioning information type basis, and/or other information specific basis. The match metric(s) are determined locally within the process-based model. This includes determining the match metric for individual processes, other localized areas within the process-based model (e.g., within a single process and/or across plural processes), at individual locations within the process-based model, and/or for other localities within the process-based model.

At an operation 20, a determination is made as to whether the process-based model sufficiently matches the conditioning information. For example, the quantified match determined at operation 18 may be compared with the match criteria obtained at operation 16 to determine if the process-based model matches the conditioning information sufficiently to satisfy the match criteria. In some embodiments, this includes comparing one or more match metrics determined at operation 18 with one or more match thresholds obtained at operation 16. Responsive to a determination that the process-based model does not sufficiently match the conditioning information, method 10 may return to operation 14 to generate another process-based model, adjust the process-based model at an operation 22, and/or take other action.

In some embodiments, operation 20 is performed based, in part or in whole, on manual inspection of the process-based model by a user/expert. This inspection may augment automated analysis of the match between the process-based model and the conditioning information, and/or may replace such analysis.

It will be appreciated that the illustration in FIG. 1 and the discussion herein of operations 14, 16, 18, and 20 being performed for the process-based model as a whole are not intended to limiting. In some embodiments, operations 14, 16, 18, and/or 20 may be iteratively performed as individual processes, or series of processes, are added to the model and verified through operations 18 and 20 before a next process, or series of processes are added.

At an operation 24, statistics are generated from the process-based model that are faithful to the process information in the process-based model. The generated statistics are faithful to the process information in the process-based model in that the stochastically generated statistics are constrained to correspond to and/or not contradict the process information in the process-based model. By way of non-limiting example variables directly extracted from both reservoir and process models such as position and/or proximity, thickness, reservoir properties such as rock type, facies, porosity and permeability, orientation, change in orientation or thickness, shape or geometry, multiple point statistics, connectivity, flow response, flow barriers and conduits and variables inferred from the reservoir model and compared for consistency with the process model such as gradient, change in gradient, texture, distance from source or process transitions, change in process, paleo setting including water depth, flow rate, sediment source sequence, location and type, grain size distribution, concentration, etc. associated with erosional or depositional features near the conditioning data and any combination and/or derivatives of these or others.

The statistics are determined locally within the process-based model such that the value of a given statistic varies as a function of location within the process-based model. Use of these statistics in the generation of a geostatistical reservoir model may be considered to be an integration of process information into the reservoir model. These statistics may be extracted at operation 24 directly from the process-based model or any derivative of the process-based model, including interpretations, numerical processing, or the derivatives.

The user may determine the specificity of the extraction (e.g., by adjusting the size of the local window for averaging, and/or through other mechanisms) to extract the level of information from the process-based model that is deemed significant to the model's application, and is judged to be informative and locally accurate. In some embodiments, the resolution (or specificity) of the local statistics extracted (or available for extraction) at a given location or area within the process-based model may depend a level of match for the given location or area with the conditioning information. For example, the resolution of the statistics extracted, or available for extraction, may be a function of one or more match metrics determined for the given location or area at operation 18.

The statistics extracted may include trends, characterized as local proportions or means for categorical or continuous reservoir properties respectively. Other local statistics may include, but in no way limiting, local stratal correlation styles, compartments and boundaries to constrain the reservoir grid and volume, local regions or populations with unique statistics and statistics that characterize the transitions between such regions, local facies classifications, locally variable continuous and categorical distributions and all associated distribution parameters, locally variable spatial continuity models including geometries, semivariogram parameters and directions of continuity, locally variable correlation coefficients for stochastic cosimulation, locally variable transition probabilities, bivariate and multivariate distributions, multiple point statistics, patterns, and/or other local statistics. In addition, any other spatial statistics (e.g. point-based such as nearest neighbor and Rippley-K functions etc., raster-based such as mathematical morphological operators and filter scores, lacunarity, surface-based such as gradient, curvature, rugosity and/or others) or connectivity or flow proxy may be calculated for constraint of the reservoir model. Also any combinations and derivatives of these statistics at any scale or statistics that represent the change in these statistics between scales or locations. Multiple sets of these statistics (and/or corresponding constraints) may be constructed from the multiple process-based models and/or by multiple implementations of the statistical inference to provide a model of uncertainty in the associated constraint.

One or more of the statistics extracted at operation 24 may preserve process information from the process-based model. This may include local gradient, paleoflow, bathymetry, water depth, and/or other process information. While these may not directly inform a geostatistical model, relationships between these parameters and geostatistical properties are modeled to all for further improvements in the local constraints.

At an operation 26, one or more geostatistical reservoir models are constructed with local constraint from the process-based model statistics generated at operation 24. In some embodiments, multiple geostatistical models may be constructed from multiple statistical inputs, representing uncertainty in these inputs. Multiple stochastic realizations for each set of statistical constraints may be simulated to represent the influence of random effects. For some statistics, such as grid, volume, global proportions, locally variable proportions, semivariograms, geometries, and/or other statistics, integration with the appropriate modeling algorithm is straightforward as these are standard inputs. For other nonstandard statistics such as transition probabilities, other spatial statistics and flow proxies, and/or other statistics, techniques may be applied to improve statistical match of the geostatistical model with the generated statistics. For other constraints that are rule-based, further rule-based modeling techniques may be applied.

At operation 26, if generation of the geostatistical model(s) provides new insights concerning process, then method 10 may return to operation 14 to include such insights in a new process-based model. Determination of whether this iteration (which is not shown in FIG. 1) should be performed may be made by a user, and/or automatically.

At an operation 28, the geostatistical model(s) generated at operation 26 may be verified. The integration of multiple information sources and/or complicated workflows may introduce unanticipated model features, numerical artifacts or increase the opportunity for blunders. This verification may include manual and/or automated inspection of match between the process-based model and the geostatistical model(s), match between conditioning information and the geostatistical model(s), search for artifacts in regions near conditioning information and/or away from conditioning information, and/or other verification procedures.

Responsive to determination that the geostatistical model(s) includes one or more artifacts that call into doubt the accuracy of the geostatistical model(s), method 10. If artifacts occur on multiple models then the conditioning data obtained in operation 12 should be check for contradiction and inaccuracy with the possibility of correcting or removing parts of the conditioning data and regeneration of process models in operation 14. If artifacts occur in a limited number of models then the corresponding process model in operation 14 may be reviewed for inaccuracy and artifacts and may be removed, otherwise, the individual models may be corrected manually or automatically or discarded. There may be a compromise between process information and conditioning. This workflow allows for the generation of multiple models (e.g., by looping over, for example, operations 14, 16, 18, 20, 22, 24, 26, and/or 28) that honor process and conditioning to different levels to assess the value of conditioning and process information with respect to constraining model results and the impact on the model application. This may include generating multiple process-based models from common conditioning information, generating multiple geostatistical models from a common process-based model, and/or other loops over the described operations. Responsive to determination that the geostatistical model(s) is sound, method 10 ends, and/or proceeds to a next operation (not shown in FIG. 1).

Figure 2:
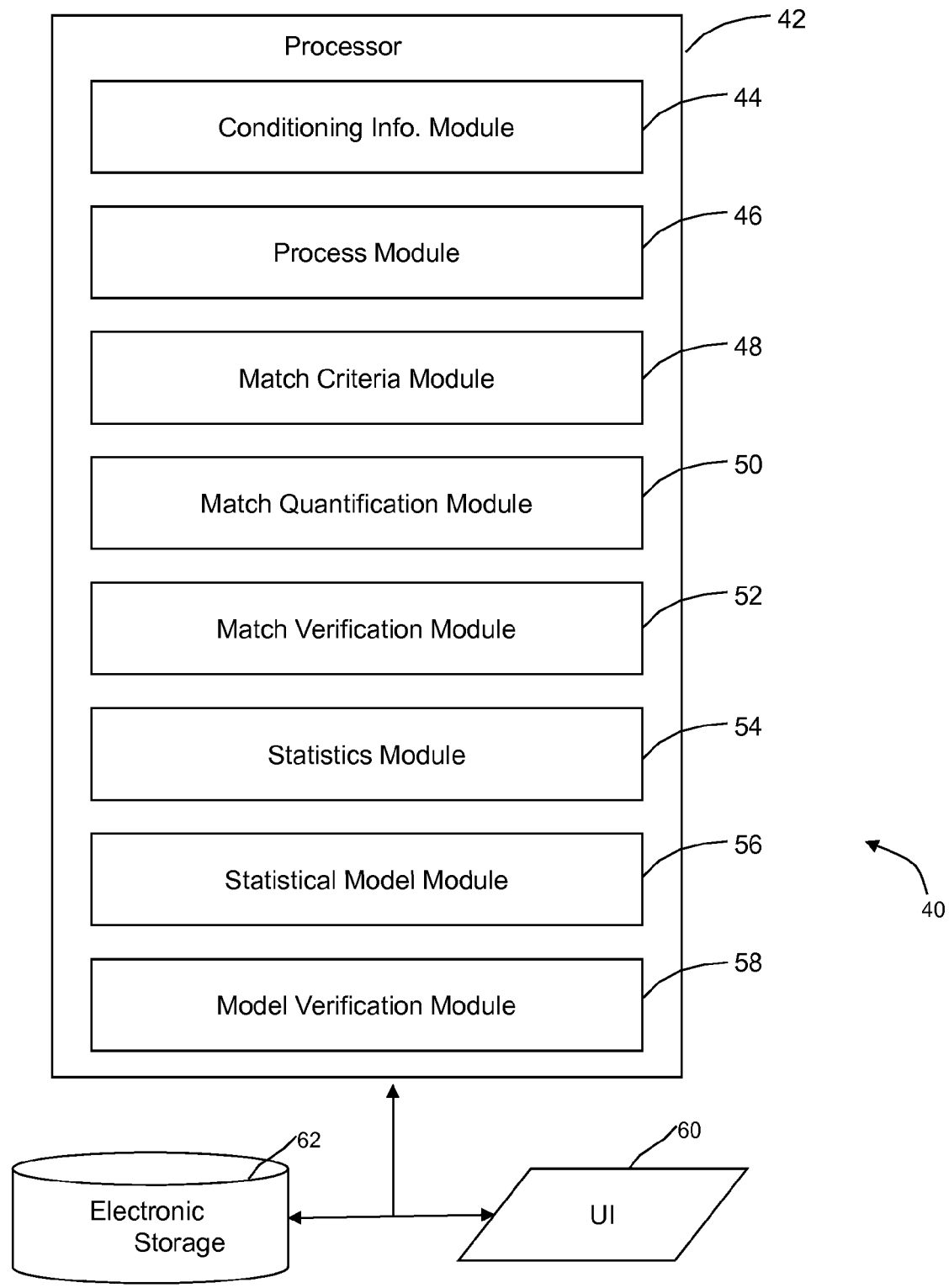
FIG. 2 illustrates a system configured to generate a geostatistical reservoir model of a geological volume of interest.

FIG. 2 illustrates a system 40 configured to generate a geostatistical model of a geological volume of interest. In some embodiments, the system 40 includes one or more processors 42 configured to execute one or more of a conditioning information module 44, a process module 46, a match criteria module 48, a match quantification module 50, a match verification module 52, a statistics module 54, a statistical model module 56, a model verification module 58, and/or other modules.

The conditioning information module 44 is configured to obtain conditioning information associated with the geological volume of interest. The conditioning information includes information derived from measurements made at or near the geological volume of interest. The conditioning information may be obtained automatically and/or based on user input. In some embodiments, conditioning information module 44 is configured to perform operations similar to or the same as operation 12 (shown in FIG. 1 and described herein).

The process module 46 is configured to generate a process-based model of the geological volume of interest. The process-based model is conformed to the conditioning information associated with the geological volume of interest. In some embodiments, process module 46 is configured to perform operations similar to or the same as operation 14 (shown in FIG. 1 and described herein).

The match criteria module 48 is configured to obtain match criteria specifying an acceptable level of correlation, or match, between the process-based model and the conditioning information associated with the geological volume of interest. The match criteria may be obtained automatically and/or based on user input (e.g., through a user interface 60). In some embodiments, match criteria module 48 is configured to perform operations similar to or the same as operation 16 (shown in FIG. 1 and described herein).

The match quantification module 50 is configured to quantify match between the process-based model and the conditioning information. This may include determining one or more match metrics that quantify match. The match metric(s) are determined from the process-based model and the conditioning information. In some embodiments, match quantification module 50 is configured to perform operations similar to or the same as operation 18 (shown in FIG. 1 and described herein).

The match verification module 52 is configured to verify the closeness of the match between the process-based model and the conditioning information satisfies match criteria (e.g., the match criteria obtained by match criteria module 48). This verification may include determining whether the match metric(s) determined by match quantification module 50 satisfy the match criteria, receiving results (e.g., via user interface 60) of a manual assessment of match between the process-based model and the conditioning information, and/or other activities. In some embodiments, match verification module 52 is configured to perform operations similar to or the same as operation 20 (shown in FIG. 1 and described herein).

The statistics module 54 is configured to generate statistics for the geological volume of interest from the process-based model. The statistics generated are faithful to the process information in the process-based model. The statistics are determined locally within the process-based model such that the value of a given statistic varies as a function of location within the process-based model. In some embodiments, statistics module 54 is configured to perform operations similar to or the same as operation 24 (shown in FIG. 1 and described herein).

The statistical model module 56 is configured to generate one or more geostatistical reservoir models of the geological volume of interest. The statistical model module 56 is configured such that the geostatistical model(s) is constrained by the statistics generated by statistics module 54. In some embodiments, statistical model module 56 is configured to perform operations similar to or the same as operation 26 (shown in FIG. 1 and described herein).

The model verification module 58 is configured to verify the geostatistical model(s) generated by statistical model module 56. This may include checking for conformance to the process-based model, conformance to the conditioning information, artifacts near and/or away from conditioning information, and/or other verifications. In some embodiments, model verification module 58 is configured to perform operations similar to or the same as operation 28 (shown in FIG. 1 and described herein).

Processor 42 is configured to provide information processing capabilities in system 40. As such, processor 42 may include one or more of a digital processor, an analog processor, a digital circuit designed to process information, an analog circuit designed to process information, a state machine, and/or other mechanisms for electronically processing information. Although processor 40 is shown in FIG. 2 as a single entity, this is for illustrative purposes only. In some implementations, processor 42 may include a plurality of processing units. Processor 42 may be configured to execute modules 44, 46, 48, 50, 52, 54, 56, and/or 58 by software; hardware; firmware; some combination of software, hardware, and/or firmware; and/or other mechanisms for configuring processing capabilities on processor 42.

It should be appreciated that although modules 44, 46, 48, 50, 52, 54, 56, and/or 58 are illustrated in FIG. 2 as being co-located within a single processing unit, in implementations in which processor 42 includes multiple processing units, one or more of modules 44, 46, 48, 50, 52, 54, 56, and/or 58 may be located remotely from the other modules. The description of the functionality provided by the different modules 44, 46, 48, 50, 52, 54, 56, and/or 58 described below is for illustrative purposes, and is not intended to be limiting, as any of modules 44, 46, 48, 50, 52, 54, 56, and/or 58 may provide more or less functionality than is described. For example, one or more of modules 44, 46, 48, 50, 52, 54, 56, and/or 58 may be eliminated, and some or all of its functionality may be provided by other ones of modules 44, 46, 48, 50, 52, 54, 56, and/or 58. As another example, processor 38 may be configured to execute one or more additional modules that may perform some or all of the functionality attributed below to one of modules 44, 46, 48, 50, 52, 54, 56, and/or 58.

System 40 may include electronic storage 60, which is accessible to processor 42. In some embodiments, electronic storage 60 includes electronic storage media that electronically stores information. The electronic storage media of electronic storage 60 may include one or both of system storage that is provided integrally (i.e., substantially non-removable) with system 40 and/or removable storage that is removably connectable to system 40 via, for example, a port (e.g., a USB port, a firewire port, etc.) or a drive (e.g., a disk drive, etc.). Electronic storage 60 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 60 may include virtual storage resources, such as storage resources provided via a cloud and/or a virtual private network. Electronic storage 60 may store software algorithms, information determined by processor 42, information received via user interface 60, and/or other information that enables system 40 to function properly. Electronic storage 60 may be a separate component within system 40, or electronic storage 60 may be provided integrally with one or more other components of system 40 (e.g., processor 42).

User interface 60 is configured to provide an interface between system 40 and users through which users may provide information to and receive information from system 40. This enables data, results, and/or instructions and any other communicable items, collectively referred to as "information," to be communicated between the users system 40. Examples of interface devices suitable for inclusion in user interface 60 include a keypad, buttons, switches, a keyboard, knobs, levers, a display screen, a touch screen, speakers, a microphone, an indicator light, an audible alarm, and a printer.

It is to be understood that other communication techniques, either hard-wired or wireless, are also contemplated by the present invention as user interface 60. For example, the present invention contemplates that user interface 60 may be integrated with a removable storage interface provided by electronic storage 62. In this example, information may be loaded into system 40 from removable storage (e.g., a smart card, a flash drive, a removable disk, etc.) that enables the user(s) to customize the implementation of system 40. Other exemplary input devices and techniques adapted for use with system 40 as user interface 60 include, but are not limited to, an RS-232 port, RF link, an IR link, modem (telephone, cable or other). In short, any technique for communicating information with system 40 is contemplated by the present invention as user interface 60.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to generate a geostatistical model of a geological volume of interest, the system comprising:
    one or more processors configured to execute computer program modules, the computer program modules comprising:
    a conditioning information module configured to obtain conditioning information associated with the geological volume of interest, wherein the conditioning information includes information derived from measurements made at or near the geological volume of interest;
    a process model module configured to generate a process-based model of the geological volume of interest, wherein the process-based model is generated using one or more algorithms which model original geological processes and are based on at least one of physical laws, empirical rules, or combinations thereof, and wherein the process-based model is conformed to the conditioning information associated with geological volume of interest;
    a statistics module configured to generate statistics from the process-based model that are faithful to the process information in the process-based model, wherein at least one or more values of the statistics are extracted locally within the process-based model such that the value of a given statistic varies as a function of location within the process-based model;
    a statistical model module configured to generate a geostatistical model of the geological volume of interest that is constrained by the statistics generated by the statistics module;
    a match quantification module configured to determine one or more match metrics that quantifies a closeness of match between the process-based model generated by the process model module and the conditioning information associated with the geological volume of interest, wherein the match quantification module is configured such that at least one of the match metrics is determined locally across the process-based model such that the match metric as a function of location in the process-based model; and
    a match verification module configured to verify, based on the match metric, that the closeness of match between the process-based model and the conditioning information meets a hatch threshold.

2. The system of claim 1, wherein the conditioning information module is configured such that the conditioning information associated with the geological volume of interest comprises one or more of well data, core data, analog information, expert information, or seismic data.

3. The system of claim 1, wherein the match quantification module is configured such that the match metric is determined individually for the processes and/or time steps included in the process-based model.

4. The system of claim 1, wherein the process model module is configured such that responsive to closeness of match between the process-based model and the conditioning data not meeting the match threshold, the process model module adjusts the process-based model to better match the conditioning information or generates a new process-based model.

5. The system of claim 1, wherein the statistics module is configured such that the statistics comprise one or more of spatial continuity, texture, connectivity, geometry, proportions of specific types or property ranges, transition probabilities between types or property ranges, or relative positions or stacking of geometries.

6. The system of claim 1, wherein the computer program modules further comprise a model verification module configured to verify the statistical model.

7. The system of claim 6, wherein the model verification module is configured such that verifying the statistical model comprises analyzing the statistical model to identify numerical artifacts and/or unanticipated model features.

8. A method of generating a geostatistical model of a geological volume of interest, the method comprising:
    obtaining conditioning information associated with the geological volume of interest, wherein the conditioning information includes information derived from measurements made at or near the geological volume of interest;
    generating a process-based model of the geological volume of interest, wherein the process-based model is generated using one or more algorithms which model original geological processes and are based on at least one of physical laws, empirical rules, or combinations thereof, and wherein the process-based model is conformed to the conditioning information associated with geological volume of interest;
    generating statistics from the process-based model that are faithful to the process information in the process-based model, wherein one or more values of the statistics are extracted locally within the process-based model such that the value of a given statistic varies as a function of location within the process-based model;
    generating a geostatistical model of the geological volume of interest that is constrained by the statistics generated from the process-based model;
    determining one or more match metrics that quantifies a closeness of match between the process-based model and the conditioning information associated with the geological volume of interest, wherein at least one of the match metrics is determined locally across the process-based model such that the match metric varies as a function of location in the process-based model; and
    verifying, based on the match metric, that the closeness of match between the process-based model and the conditioning information meets a match threshold.

9. The method of claim 8, wherein the obtained conditioning information associated with the geological volume of interest comprises one or more of well data, core data, analog information, expert information, or seismic data.

10. The method of claim 8, wherein the match metric is determined individually for the processes included in the process-based model.

11. The method of claim 8, wherein responsive to closeness of match between the process-based model and the conditioning data not meeting the match threshold, the method further comprises either adjusting the process-based model to better match the conditioning information or generating a new process-based model.

12. The method of claim 8, wherein the local statistics comprise one or more of spatial continuity, texture, connectivity, geometry, proportions of specific types or property ranges, transition probabilities between types or property ranges, or relative positions or stacking of geometries.

13. The method of claim 8, further comprising verifying the statistical model.

14. The method of claim 13, wherein verifying the statistical model comprises analyzing the statistical model to identify numerical artifacts and/or unanticipated model features.

15. Non-transitory electronic storage media storing machine-readable instructions that cause one or more processors to perform operations that result in generation of a geostatistical model of a geological volume of interest, the operations comprising:

obtaining conditioning information associated with the geological volume of interest, wherein the conditioning information includes information derived from measurements made at or near the geological volume of interest;

generating a process-based model of the geological volume of interest, wherein the process-based model is generated using one or more algorithms which model original geological processes and are based on at least one of physical laws, empirical rules, or combinations thereof, and wherein the process-based model is conformed to the conditioning information associated with geological volume of interest;

generating statistics from the process-based model that are faithful to the process information in the process-based model, wherein one or more values of the statistics are extracted locally within the process-based model such that the value of a given statistic varies as a function of location within the process-based model;

generating a geostatistical model of the geological volume of interest that is constrained by the statistics generated from the process-based model; and determining one or more match metrics that quantifies a closeness of match between the process-based model and the conditioning information associated with the geological volume of interest, wherein at least one of the match metrics is determined locally across the process-based model such that the match metric varies as a function of location in the process-based model; and verifying, based on the match metric, that the closeness of match between the process-based model and the conditioning information meets a match threshold.

* * * * *